United States Patent
With Pedersen et al.

(10) Patent No.: US 11,062,113 B2
(45) Date of Patent: Jul. 13, 2021

(54) FINGERPRINT AUTHENTICATION SYSTEM AND METHOD PROVIDING FOR REDUCED LATENCY

(71) Applicant: FINGERPRINT CARDS AB, Gothenburg (SE)

(72) Inventors: Morten With Pedersen, Frederiksberg (DK); Morten Hansen, Hellerup (DK)

(73) Assignee: FINGERPRINT CARDS AB, Gothenburg (SE)

( * ) Notice: Subject to any disclaimer, the term of this patent is extended or adjusted under 35 U.S.C. 154(b) by 14 days.

(21) Appl. No.: 16/605,550

(22) PCT Filed: Apr. 19, 2018

(86) PCT No.: PCT/SE2018/050394
§ 371 (c)(1),
(2) Date: Oct. 16, 2019

(87) PCT Pub. No.: WO2018/199832
PCT Pub. Date: Nov. 1, 2018

(65) Prior Publication Data
US 2020/0125816 A1 Apr. 23, 2020

(30) Foreign Application Priority Data
Apr. 27, 2017 (SE) ...................... 1750503-3

(51) Int. Cl.
*G06K 9/20* (2006.01)
*G06K 9/00* (2006.01)

(52) U.S. Cl.
CPC ....... *G06K 9/0002* (2013.01); *G06K 9/00087* (2013.01); *G06K 9/00926* (2013.01)

(58) Field of Classification Search
CPC ............... G06K 9/00006–002; G06K 9/0002
See application file for complete search history.

(56) References Cited

U.S. PATENT DOCUMENTS

2006/0285728 A1* 12/2006 Leung ................. G06K 9/0002
                                                                382/124
2014/0226879 A1   8/2014 Westerman et al.
(Continued)

FOREIGN PATENT DOCUMENTS

WO    2017058082 A1    4/2017

OTHER PUBLICATIONS

PCT International Search Report and Written Opinion dated Jun. 1, 2018 for International Application No. PCT/SE2018/050394, 10 pages.

(Continued)

*Primary Examiner* — Brian Werner
(74) *Attorney, Agent, or Firm* — RMCK Law Group, PLC (57) ABSTRACT

A fingerprint image is acquired, and it is determined if the finger is still touching the sensing surface. When the finger no longer touches the sensing surface, the user is authenticated based on one or several fingerprint image(s) acquired so far. When the finger still touches the sensing surface, a quality measure is determined for the fingerprint image. When a quality of the fingerprint image fulfills a predefined quality criterion, the user is authenticated based on one or several fingerprint images acquired so far. When the quality of the fingerprint image fails to fulfill the predefined quality criterion, a subsequent fingerprint image is acquired. When the finger still touches the sensing surface, and the quality measure indicates that the quality of the subsequent fingerprint image fulfills the predefined quality criterion, the user is authenticated based on one or several fingerprint images acquired so far including the subsequent fingerprint image.

8 Claims, 4 Drawing Sheets

(56) References Cited

U.S. PATENT DOCUMENTS

| | | |
|---|---|---|
| 2014/0267659 A1 | 9/2014 | Lyon et al. |
| 2016/0063296 A1 | 3/2016 | Du et al. |
| 2017/0004350 A1 | 1/2017 | Clausen |
| 2017/0039409 A1 | 2/2017 | Han et al. |

OTHER PUBLICATIONS

Extended European Search Report dated Dec. 16, 2020 for EP Application No. 18790229.1, 7 pages.

* cited by examiner

FINGERPRINT AUTHENTICATION SYSTEM AND METHOD PROVIDING FOR REDUCED LATENCY

CROSS-REFERENCE TO RELATED APPLICATIONS

This application is a 371 U.S. National Stage of International Application No. PCT/SE2018/050394, filed Apr. 19, 2018, which claims priority to Swedish Patent Application No. 1750503-3, filed Apr. 27, 2017. The disclosures of each of the above applications are incorporated herein by reference in their entirety.

FIELD OF THE INVENTION

The present invention relates to a method of authenticating a user by means of a fingerprint authentication system, and to such a fingerprint authentication system.

BACKGROUND OF THE INVENTION

Various types of biometric systems are used more and more in order to provide for increased security and/or enhanced user convenience.

In particular, fingerprint authentication systems have been adopted in, for example, consumer electronic devices, thanks to their small form factor, high performance, and user acceptance.

With more widespread and diverse use of fingerprint authentication, the demands on speed and responsiveness are increasing.

It would therefore be desirable to provide for more responsive fingerprint authentication.

SUMMARY

In view of the above, it is an object of the present invention to provide for improved fingerprint authentication, in particular to provide for more responsive fingerprint authentication.

According to a first aspect of the present invention, it is therefore provided a method of authenticating a user by means of a fingerprint authentication system comprising a fingerprint sensing arrangement having a sensing surface; finger detecting circuitry; and processing circuitry, the method comprising the steps of: acquiring, by the fingerprint sensing arrangement, a first fingerprint image of a finger touching the sensing surface; determining, by the finger detecting circuitry, if the finger is still touching the sensing surface; when it is determined that the finger is no longer touching the sensing surface, authenticating, by the processing circuitry, the user based on the first fingerprint image; when it is determined that the finger is still touching the sensing surface, determining, by the processing circuitry, a quality measure for the first fingerprint image; when the quality measure indicates that a quality of the first fingerprint image fulfills a predefined quality criterion, authenticating, by the processing circuitry, the user based on the first fingerprint image; when the quality measure indicates that the quality of the first fingerprint image fails to fulfill the predefined quality criterion, acquiring, by the fingerprint sensing arrangement, a second fingerprint image of the finger touching the sensing surface; determining, by the finger detecting circuitry, if the finger is still touching the sensing surface; when it is determined that the finger is no longer touching the sensing surface, authenticating, by the processing circuitry, the user based on at least one of the first fingerprint image and the second fingerprint image; when it is determined that the finger is still touching the sensing surface, determining, by the processing circuitry, a quality measure for the second fingerprint image; and when the quality measure indicates that a quality of the second fingerprint image fulfills the predefined quality criterion, authenticating, by the processing circuitry, the user based on at least one of the first fingerprint image and the second fingerprint image.

The first fingerprint image and the second fingerprint image may advantageously be acquired during the same finger placement event, when the finger is not being swiped across the sensor surface. In other words, the finger may be substantially stationary, at least in a lateral direction, during the finger placement event.

The use of the terms "first fingerprint image" and "second fingerprint image" above should be understood to indicate that the "second fingerprint image" is acquired after the "first fingerprint image". The use of the terms "first fingerprint image" and "second fingerprint image" above should not be construed to require that the "first fingerprint image" is the very first fingerprint image that is acquired in a sequence of fingerprint images.

It should be noted that a fingerprint authentication system may be comprised in a stand-alone electronic device, such as a mobile communication device, a watch or a smart card, or may be formed by interconnected devices, such as a computer and a fingerprint acquisition device connected to the computer.

The fingerprint sensing arrangement may, for example, be a capacitive fingerprint sensing arrangement, detecting a measure indicative of the capacitive coupling between each sensing element in an array of sensing elements and a finger surface touching the sensing arrangement surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, acoustic, optical, thermal or piezo-electric fingerprint sensing arrangements etc.

Furthermore, the fingerprint authentication system according to embodiments of the present invention may be embodied as a system of components, or in a single component, such as an integrated circuit.

The finger detecting circuitry may be dedicated finger detecting circuitry, or a set of the sensing elements may be used as finger detecting circuitry. Further, the finger detection carried out by the finger detecting circuitry may be based directly on an analog detecting signal and/or on a digital representation of the analog detecting signal.

The present invention is based upon the realization that the speed of fingerprint authentication, as experienced by a user, can be increased by acquiring fingerprint images until the user lifts her/his finger from the fingerprint sensor surface or until a sufficiently good fingerprint image has been acquired, and then perform fingerprint authentication based on the available fingerprint image(s). Embodiments of the present invention are expected to provide for an increased perceived responsiveness of the fingerprint authentication system, as well as a high quality of the fingerprint authentication, as the acquired fingerprint images will often be qualified before proceeding to authentication (matching).

In embodiments of the method according to the present invention, the above-mentioned quality measure may be determined based on a number of unsaturated pixels. For instance, the quality measure may be indicative of a minimum number of unsaturated pixels. It should, however, be noted that any other quality measure can be used, provided that such a quality measure can be determined relatively quickly, while still providing an indication of the expected suitability of the fingerprint image for authentication processing (matching).

In embodiments of the method according to the present invention, the step of authenticating the user based on at least one of the first fingerprint image and the second fingerprint image may comprise the steps of: evaluating the first fingerprint image and the second fingerprint image to select one of the first fingerprint image and the second fingerprint image as an authentication fingerprint image; retrieving a stored enrolment representation of the finger; processing, by the processing circuitry, the authentication fingerprint image to determine an authentication representation based on the authentication fingerprint image; determining if a match between the authentication representation and the stored enrolment representation fulfills an authentication requirement; and providing, when the match fulfills the authentication requirement, a signal indicating a successful authentication.

In the context of the present application, the "enrolment representation" and/or the "authentication representation" of a fingerprint image may be any information extracted from the fingerprint image, which is useful for assessing the similarity between fingerprint images acquired at different times. For instance, the enrolment/authentication representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

According to various embodiments, the method may further comprise the step of: adjusting at least one setting of the fingerprint sensing arrangement after the step of acquiring the first fingerprint image and before the step of acquiring the second fingerprint image.

For instance, the first fingerprint image may be acquired using default settings, and the at least one setting of the fingerprint sensing arrangement may be adjusted based on at least one property of the first fingerprint image, according to a predetermined scheme or based on any other suitable parameter. This may result in a faster fingerprint authentication procedure and/or in improved reliability of the fingerprint authentication. In embodiments, the at least one setting of the fingerprint sensing arrangement may additionally be adjusted before acquiring the first fingerprint image.

According to a second aspect of the present invention, there is provided a fingerprint authentication system for authenticating a user, comprising: a fingerprint sensing arrangement; finger detecting circuitry; and processing circuitry connected to the fingerprint sensing arrangement and to the finger detecting circuitry, the processing circuitry being configured to: control the fingerprint sensing arrangement to acquire a first fingerprint image of a finger touching the sensing surface; receive, from the finger detecting circuitry, a first finger detect signal indicating whether or not the finger is still touching the sensing surface; authenticate, when the first finger detect signal indicates that the finger is no longer touching the sensing surface, the user based on the first fingerprint image; determine, when the first finger detect signal indicates that the finger is still touching the sensing surface, a quality measure for the first fingerprint image; authenticate, when the quality measure indicates that a quality of the first fingerprint image fulfills a predefined quality criterion, the user based on the first fingerprint image; control, when the quality measure indicates that the quality of the first fingerprint image fails to fulfill the predefined quality criterion, the fingerprint sensing arrangement to acquire a second fingerprint image of the finger touching the sensing surface; receive, from the finger detecting circuitry, a second finger detect signal indicating whether or not the finger is still touching the sensing surface; authenticate, when the second finger detect signal indicates that the finger is no longer touching the sensing surface, the user based on at least one of the first fingerprint image and the second fingerprint image; determine, when the second finger detect signal indicates that the finger is still touching the sensing surface, a quality measure of the second fingerprint image; and authenticate, when the quality measure indicates that a quality of the second fingerprint image fulfills the predefined quality criterion, the user based on at least one of the first fingerprint image and the second fingerprint image.

The processing circuitry may be realized as hardware and/or as software running on one or several processors.

According to embodiments, the finger detecting circuitry may be configured to detect if the finger is still touching the sensing surface at discrete detecting events.

In such embodiments, for increasing the accuracy in the output from the finger detecting circuitry, a signal indicating that the finger is no longer touching the sensing surface may only be provided when the finger detecting circuitry detects that the finger no longer touches the sensing surface of the fingerprint sensing device at at least two consecutive detecting events.

Moreover, the fingerprint authentication system according to embodiments of the invention may further comprise an electrically conductive finger detecting structure; and the finger detecting circuitry may be configured to provide the finger lost signal in response to the capacitive coupling between the finger detecting structure and the finger candidate changing from a first value above a threshold capacitive coupling to a second value below the threshold capacitive coupling. The threshold capacitive coupling may, for example, be represented by a threshold voltage. Furthermore, the threshold capacitive coupling may be predefined, or it may be determined dynamically based on a sensed signal. For instance, the threshold capacitive coupling may be based on a sensed noise level.

Further embodiments of, and effects obtained through this second aspect of the present invention are largely analogous to those described above for the first aspect of the invention.

The fingerprint authentication system according to embodiments of the present invention may be included in an electronic device, further comprising a processing unit configured to control the fingerprint authentication system to carry out a fingerprint authentication of a user, and to perform at least one action only upon successful authentication of the user.

In summary, the present invention relates to a method according to which: a fingerprint image is acquired, and it is determined if the finger is still touching the sensing surface. When the finger no longer touches the sensing surface, the user is authenticated based on one or several fingerprint image(s) acquired so far. When it is determined that the finger still touches the sensing surface, a quality measure is determined for the fingerprint image. When the quality measure indicates that a quality of the fingerprint image fulfills a predefined quality criterion, the user is authenticated based on one or several fingerprint images acquired so far. When the quality measure indicates that the quality of the fingerprint image fails to fulfill the predefined quality criterion, a subsequent fingerprint image is acquired. When the finger still touches the sensing surface, and the quality measure indicates that the quality of the subsequent fingerprint image fulfills the predefined quality criterion, the user is authenticated based on one or several fingerprint images acquired so far including the subsequent fingerprint image.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the electronic device according to the present invention are mainly discussed with reference to a mobile phone with an elongated fingerprint sensor being accessible through an opening in the back cover. Furthermore, the fingerprint sensor 3 and the processing circuitry are schematically indicated as being different separate components.

It should be noted that this by no means limits the scope of the present invention, which equally well includes, for example, other types of electronic devices, such as smart watches, smart cards, laptop computers etc. Furthermore, the fingerprint sensing device need not be elongated, but could be substantially square or have any other suitable shape. Moreover, the fingerprint sensing device may be arranged in any suitable location in the electronic device, such as being integrated with a button on the front or the side of the mobile phone, or arranged under a cover glass etc. In addition, the processing circuitry, or parts of the processing circuitry, may be integrated with the fingerprint sensor.

Figure 1A:
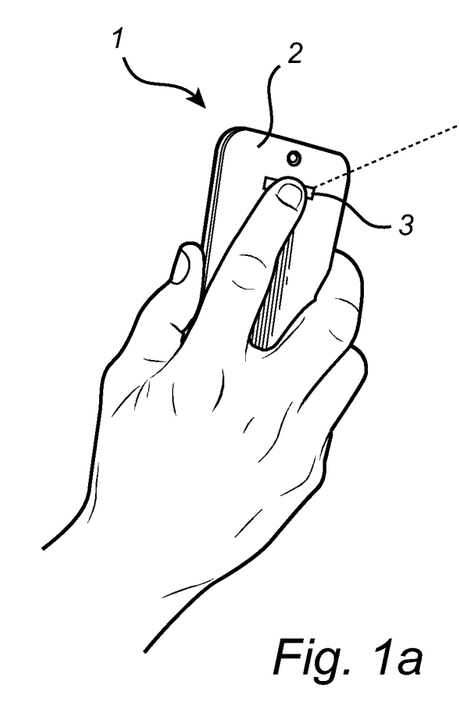
FIGS. 1a-b schematically illustrate an electronic device including a fingerprint sensing device according to an example embodiment of the present invention.

FIG. 1a schematically illustrates an example embodiment of the electronic device according to the present invention, in the form of a mobile phone 1 having a housing 2 and an integrated fingerprint sensor 3 being accessible through an opening in the housing 2. The fingerprint sensor 3 may, for example, be used for unlocking the mobile phone 1 and/or for authorizing transactions carried out using the mobile phone etc.

Figure 1B:
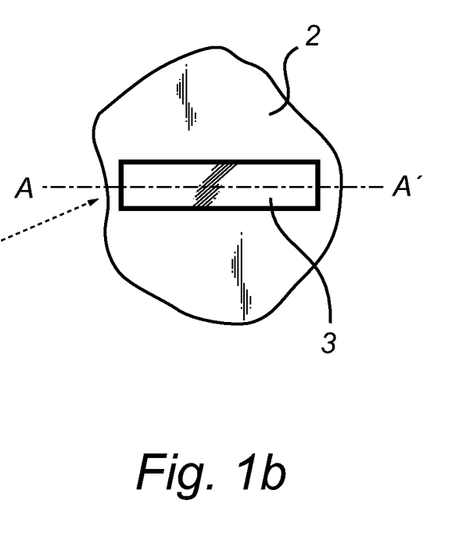

FIG. 1b is an enlarged view of the fingerprint sensor 3 and its integration with the housing 2.

Figure 2:
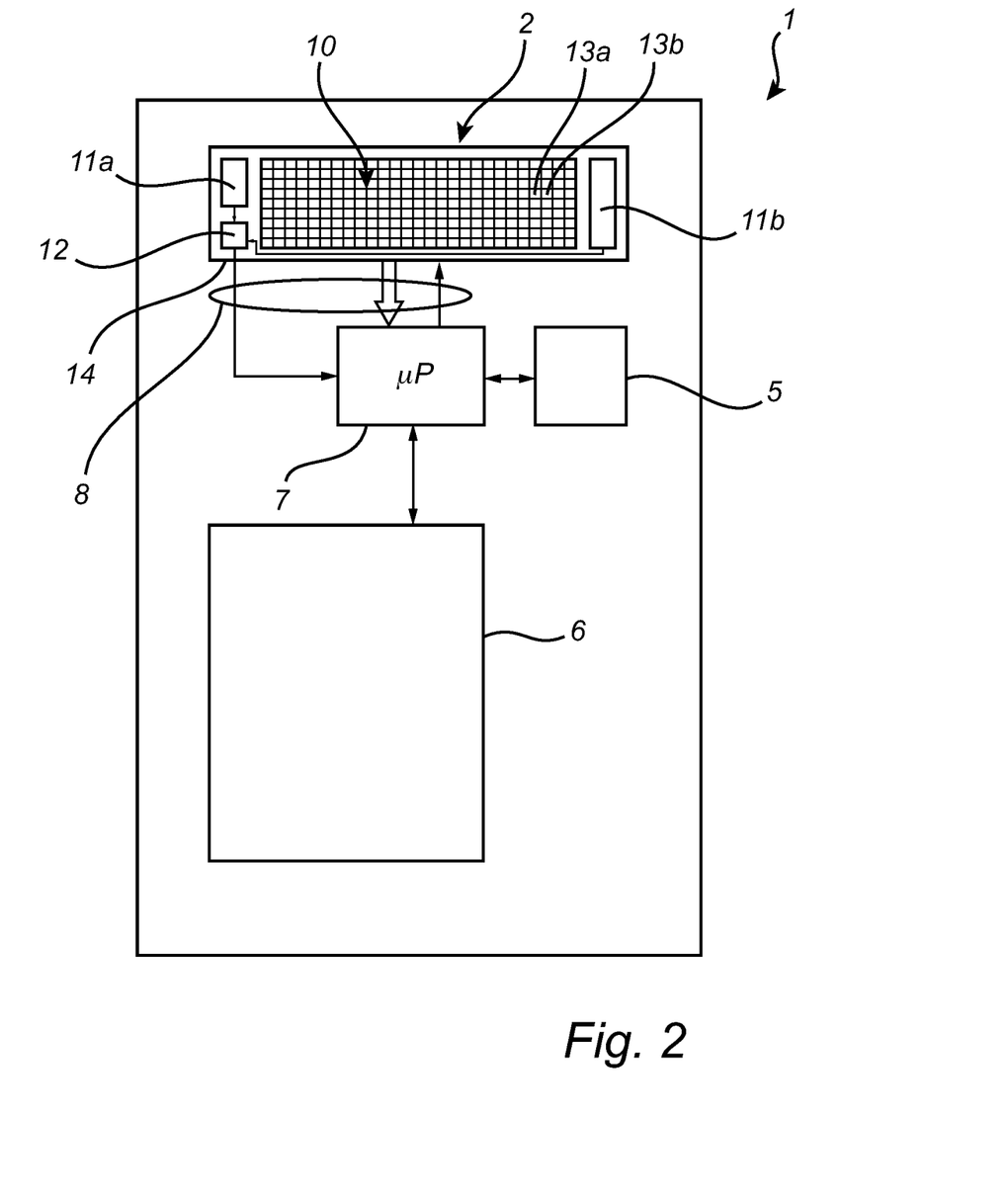
FIG. 2 is a block diagram of the electronic device in FIGS. 1a-b.

With reference to FIG. 2, which is a schematic block-diagram of the mobile phone is FIG. 1a, the mobile phone 1, in addition to the above-mentioned fingerprint sensor 3, comprises communication circuitry 5, user interface circuitry 6, processing circuitry 7, and a fingerprint sensor interface 8, here schematically indicated by the line arrows indicating control signals and the block arrow indicating data transfer.

As is schematically indicated in FIG. 2, the fingerprint sensor 3 comprises a sensor array 10 and finger detecting circuitry, here provided in the form of finger detecting structures 11a-b and a finger detection circuit 12 connected to the finger detecting structures 11a-b. The sensor array 10 includes a plurality of sensing elements 13a-b (only two neighboring sensing elements are indicated with reference numerals in FIG. 2 to avoid cluttering the drawing). The fingerprint sensor 3 further comprises a finger detection output 14 for externally providing a Finger Detect and/or a Finger Lost signal from the finger detection circuit 12. Although not shown in FIG. 2, the fingerprint sensing device 3 additionally comprises readout circuitry for converting sensing signals from the sensing elements to provide a representation of a fingerprint touching the sensor surface. Exemplary readout circuitry will be described further below with reference to FIG. 3.

The above-mentioned communication circuitry 5 may, for example, comprise one or several of various antennas and control units for wireless communication, and the above-mentioned user interface circuitry 6 may, for example, comprise one or several of a display, a microphone, a speaker, and a vibration unit.

Figure 3:
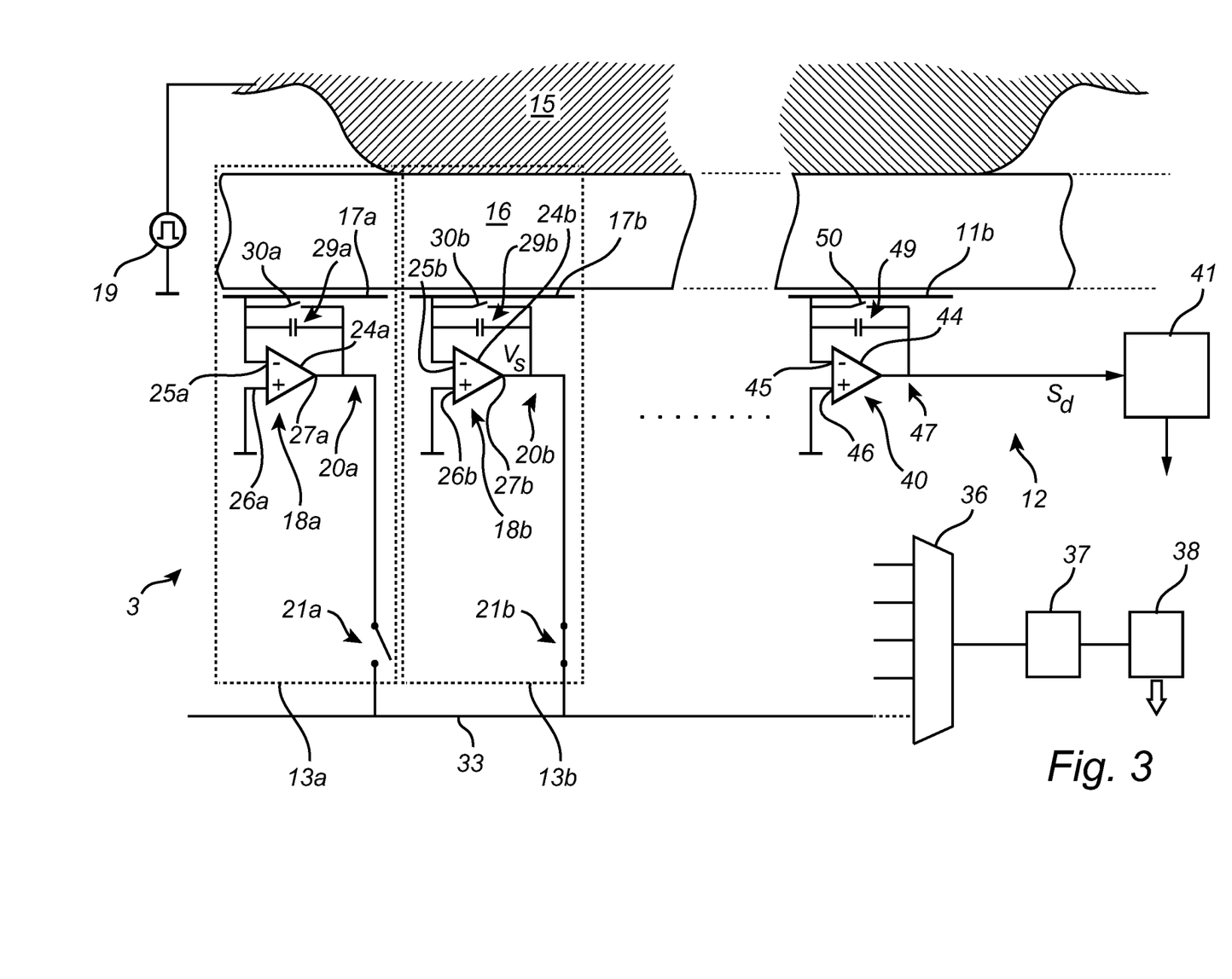
FIG. 3 is a schematic cross-section view of a portion of the fingerprint sensing device in FIG. 1b.

FIG. 3 is a schematic cross section of a portion of the fingerprint sensing device 3 in FIG. 1b taken along the line A-A' with a finger 15 placed on top of a protective dielectric top layer 16 covering the sensor array 5 and the finger detecting structures 11a-b. Referring to FIG. 3, the fingerprint sensing device 3 comprises an excitation signal providing circuit 19 electrically connected to the finger via a conductive finger drive structure (not shown in FIG. 3), a plurality of sensing elements 13a-b, and a finger detection arrangement comprising the finger detecting structure 11b, and the finger detection circuit 12 connected to the finger detecting structure 11b.

As is schematically indicated in FIG. 3, each sensing element 13a-b comprises a conductive sensing structure, here in the form of a metal plate 17a-b underneath the protective dielectric top layer 16, a charge amplifier 18a-b, and selection circuitry, here functionally illustrated as a simple selection switch 21a-b for allowing selection/activation of the respective sensing element 13a-b.

The charge amplifier 18a-b comprises at least one amplifier stage, here schematically illustrated as an operational amplifier (op amp) 24a-b having a first input (negative input) 25a-b connected to the sensing structure 17a-b, a second input (positive input) 26a-b connected to sensor ground or another reference potential, and an output 27a-b. In addition, the charge amplifier 18a-b comprises a feedback capacitor 29a-b connected between the first input 25a-b and the output 27a-b, and reset circuitry, here functionally illustrated as a switch 30a-b, for allowing controllable discharge of the feedback capacitor 29a-b. The charge amplifier 18a-b may be reset by operating the reset circuitry 30a-b to discharge the feedback capacitor 29a-b.

As is often the case for an op amp 24a-b in a negative feedback configuration, the voltage at the first input 25a-b follows the voltage at the second input 26a-b. Depending on the particular amplifier configuration, the potential at the first input 25a-b may be substantially the same as the potential at the second input 26a-b, or there may be a substantially fixed offset between the potential at the first input 25a-b and the potential at the second input 26a-b. In the configuration of FIG. 3, the first input 25a-b of the charge amplifier is virtually grounded.

When a time-varying potential is provided to the finger 15 by the excitation signal providing circuitry 19, a corresponding time-varying potential difference occurs between the sensing structure 17a-b and the finger 15.

The above-described change in potential difference between the finger 15 and the sensing structure 17a-b results in a sensing voltage signal $V_s$ on the output 27a-b of the charge amplifier 18a-b.

When the indicated sensing element 13a-b is selected for sensing, the selection switch 21a-b is closed to provide the sensing signal to the readout line 33. The readout line 33, which may be a common readout line for a row or a column of the sensor array 5 in FIG. 2, is shown in FIG. 3 to be connected to a multiplexer 36. As is schematically indicated in FIG. 3, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 13a-b to a digital representation of the fingerprint pattern of the finger 15 on the sensor 2.

As is schematically indicated in FIG. 3, the finger detection circuit 12 here comprises a dedicated finger detecting structure 11b in the form of a metal plate, a charge amplifier 40 and a detection signal processing circuit 41. The charge amplifier 40, which is similar in principle to the charge amplifiers 18a-b comprised in the sensing elements 13a-b described above. Accordingly, the charge amplifier 40 comprises at least one amplifier stage, here schematically illustrated as an operational amplifier (op amp) 44 having a first input (negative input) 45 connected to the finger detecting structure 11b, a second input (positive input) 46 connected to sensor ground or another reference potential, and an output 47. In addition, the charge amplifier 40 comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 3, the output of the charge amplifier is a finger detection signal $S_d$ (in the form of a voltage) indicative of the capacitive coupling between the finger 15 and the finger detecting structure 11b.

In FIG. 3, the finger 15 is shown as being connected to an excitation circuit 19 for providing the desired potential difference between the finger, and the sensing plates 17a-b of the sensor array 5 and the finger detecting structure 4a. It should be noted that this desired potential difference may alternatively be provided by changing the ground level of the fingerprint sensing device in relation to the ground level of the electronic device (such as mobile phone 1) in which the fingerprint sensing device 3 is included.

Figure 4:
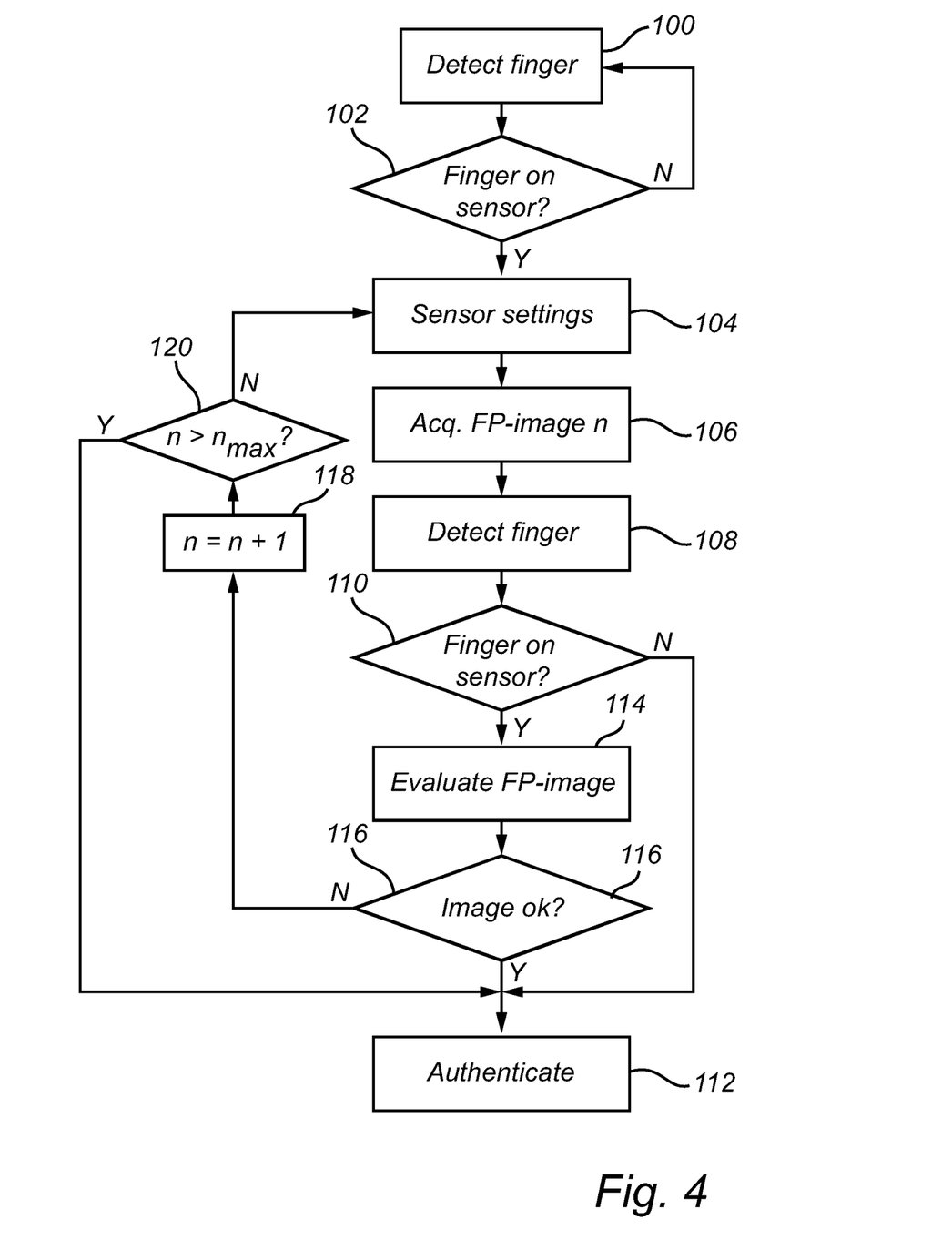
FIG. 4 is a flow-chart schematically illustrating a method according to an embodiment of the present invention.

An exemplary embodiment of the method according to the present invention will now be described with reference to the flow-chart in FIG. 4 together with the illustrations in FIG. 2 and FIG. 3 where applicable.

In a first step 100, the presence of a finger 15 is detected using the finger detecting circuitry. Based on the output from the finger detection circuit 12 it is determined, in step 102 if there is a finger on the fingerprint sensor 3. If it is determined that there is no finger on the sensor 3, the method returns to step 100 and continues to monitor the output from the finger detection circuit 12.

If it is instead determined that there is a finger on the sensor 3, the method proceeds to step 104 and controls at least one setting of the fingerprint sensor 3, such as a setting of the ADC 38, based on a preliminary reading of the finger 15. Such a preliminary reading could, for instance, be carried out using a subset of the sensing elements 13a-b and/or the finger detecting circuitry. In the subsequent step 106, a first fingerprint image (FP-image n) is acquired using the fingerprint sensor 3 and stored in a memory, which may be comprised in the processing circuitry 7.

Following acquisition of the first fingerprint image, the presence of a finger 15 is again detected using the finger detecting circuitry in step 108. Based on the output from the finger detection circuit 12 it is determined, in step 110 if the finger 15 is still touching the sensing surface of the fingerprint sensor 3. If it is determined that the finger 15 no longer touches the sensing surface of the fingerprint sensor 3, which means that the user has lifted her/his finger from the fingerprint sensor 3, the method directly proceeds to attempt to authenticate the user, in step 112, based on the fingerprint image(s) acquired so far (one or several fingerprint images).

If it is instead determined that the finger 15 is still on the sensor 3, the method proceeds to step 114, where the processing circuitry 7 determines a quality measure for the first fingerprint image (FP-image n). Various different quality measures can be used, as will be apparent to one of ordinary skill in the art. One example of a suitable quality measure may relate to the fraction of pixels in the fingerprint image that are unsaturated. The processing circuitry 7 may thus determine the number of pixels in the fingerprint image that are not saturated (for instance that are not either 0 or 255, i.e. that are in the range [1;254]) and then return a score in the range [0;1000] that is proportional to the fraction of pixels that are not saturated. A score of 0 means that all pixels are saturated, and a score of 1000 means that no pixels are saturated.

In the subsequent step 116, the quality measure determined in step 114 is evaluated to determine if the fingerprint image seems good enough to proceed to the authentication step 112, or if additional fingerprint images should be acquired.

Based on the above-described quality measure, related to the number of unsaturated pixels of the fingerprint image, one criterion could be to use an absolute threshold on the image quality measure, and stop the image capturing process when the fingerprint image has a better score than a predefined threshold.

Another criterion could be to use a relative ratio threshold to compare the image quality measure for the current image capture to the quality measure for the previous image capture and then stop the image capturing process if the image quality measure degrades too much.

This criterion will address the possible situation where the finger is on its way up in the last captured image since we in that case will start to see saturation in the white end of the intensity scale (here defined as 255) in the region where there is no longer a finger on the sensor.

If it is determined in step 116 that the fingerprint image (FP-image n) is considered to not be good enough to proceed to authentication, the method proceeds to step 118 where the counter is incremented, and then to step 120 to determine if a predefined maximum number of fingerprint images $n_{max}$ have been acquired. If this is the case, the method proceeds to the authentication step 112, where the processing circuitry 7 performs authentication processing based on at least one of the $n_{max}$ acquired fingerprint images.

If the maximum number of acquired fingerprint images has not been exceeded, the method proceeds to again perform the above described steps, starting from step 104.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A fingerprint authentication system for authenticating a user, comprising:
   a fingerprint sensor;
   finger detecting circuitry; and
   processing circuitry connected to said fingerprint sensor and to said finger detecting circuitry, said processing circuitry being configured to:
   control said fingerprint sensor to acquire a first fingerprint image of a finger touching said sensing surface;
   receive, from said finger detecting circuitry, a first finger detect signal indicating whether or not the finger is still touching said sensing surface;
   authenticate, when said first finger detect signal indicates that the finger is no longer touching said sensing surface, said user based on said first fingerprint image;
   determine, when said first finger detect signal indicates that the finger is still touching said sensing surface, a quality measure for said first fingerprint image;
   authenticate, when the quality measure indicates that a quality of said first fingerprint image fulfills a predefined quality criterion, said user based on said first fingerprint image;
   control, when the quality measure indicates that the quality of said first fingerprint image fails to fulfill said predefined quality criterion, said fingerprint sensor to acquire a second fingerprint image of the finger touching said sensing surface;
   receive, from said finger detecting circuitry, a second finger detect signal indicating whether or not the finger is still touching said sensing surface;
   authenticate, when said second finger detect signal indicates that the finger is no longer touching said sensing surface, said user based on at least one of said first fingerprint image and said second fingerprint image;
   determine, when said second finger detect signal indicates that the finger is still touching said sensing surface, a quality measure of said second fingerprint image; and
   authenticate, when the quality measure indicates that a quality of said second fingerprint image fulfills said predefined quality criterion, said user based on at least one of said first fingerprint image and said second fingerprint image.

2. An electronic device comprising;
   a fingerprint authentication system according to claim 1; and
   at least one processor configured to control said fingerprint authentication system to carry out a fingerprint authentication of a user, and to perform at least one action only upon successful authentication of said user.

3. The fingerprint authentication system according to claim 1, wherein said quality measure is determined based on a number of unsaturated pixels.

4. The fingerprint authentication system according to claim 3, wherein said quality measure is determined based on said number of unsaturated pixels in relation to a total number of pixels.

5. The fingerprint authentication system according to claim 3, wherein said quality criterion is indicative of a minimum number of unsaturated pixels.

6. The fingerprint authentication system according to claim 1, wherein said processing circuitry is configured to, when said second fingerprint image has been acquired:
   evaluate said first fingerprint image and said second fingerprint image to select one of said first fingerprint image and said second fingerprint image as an authentication fingerprint image;
   retrieve a stored enrolment representation of said finger;
   process said authentication fingerprint image to determine an authentication representation based on said authentication fingerprint image;
   determine if a match between said authentication representation and said stored enrolment representation fulfills an authentication requirement; and
   provide, when said match fulfills said authentication requirement, a signal indicating a successful authentication.

7. The fingerprint authentication system according to claim 1, wherein said processing circuitry is configured to, when said second fingerprint image has been acquired:
   retrieve a stored enrolment representation of said finger;
   process said first fingerprint image and said second fingerprint image to determine an authentication representation based on said first fingerprint image and said second fingerprint image;
   determine if a match between said authentication representation and said stored enrolment representation fulfills an authentication requirement; and
   provide, when said match fulfills said authentication requirement, a signal indicating a successful authentication.

8. The fingerprint authentication system according to claim 1, wherein said processing circuitry is configured to:
   adjust at least one setting of said fingerprint sensor acquiring said first fingerprint image and before acquiring said second fingerprint image.

\* \* \* \* \*